United States Patent Office 3,421,849
Patented Jan. 14, 1969

3,421,849
METHOD FOR UPGRADING PEBBLE PHOSPHATE
Arthur N. Baumann, Lakeland, Fla., assignor to International Minerals & Chemical Corporation, a corporation of New York
No Drawing. Filed May 7, 1964, Ser. No. 365,805
U.S. Cl. 23—109
Int. Cl. C01b 25/12; C01b 25/04
7 Claims

ABSTRACT OF THE DISCLOSURE

A phosphate rock of increased BPL and having desirable characteristics for use in the manufacture of phosphoric acid and superphosphate is prepared by treating pebble phosphate having a BPL in the range of 65 to 80% and a size in the range of about −6 +80 mesh with 5 to 20% by weight of phosphoric acid having a $P_2O_5$ content in excess of 25%. The amount and concentration of the phosphoric acid is controlled to produce a reaction product of increased BPL in the range of 75 to 85%. The reaction product is heated to a temperature in the range of 450° F. to 1400° F. to improve its physical properties, and enhance its characteristics for further manufacturing operations. The product is heated to 450° to 700° F. if it is intended for use in the manufacture of superphosphate, and should be heated in the range of from 800° to 1400° F. if it is intended to be used in the manufacture of phosphoric acid.

---

This invention relates to a method for increasing the phosphorus content of phosphate rock concentrates. More specifically, this invention relates to the treatment of phosphate rock concentrates with phosphoric acid followed by treatment at an elevated temperature, whereby a phosphate rock of increased phosphorus content having desirable physical properties for use in subsequent operations is obtained.

In recent years definite preferences have developed among purchasers of commercial phosphate rock for rocks of higher phosphorus content, which is usually expressed as percent BPL (Bone Phosphate of Lime). At the present time there is a very strong preference for phosphate rocks having a BPL in excess of 75%, and particularly for rocks having a BPL in the range of about 78 to 82%. This preference is not altogether arbitrary and finds its roots to some extent in difficulties encountered in producing fertilizer materials such as superphosphate and triple superphosphate having a sufficiently high available $P_2O_5$ content to meet commercial standards from phosphate rock having a BPL lower than 75%. Also, purchasers of phosphate rock who operate a plant designed for a phosphate rock feed having a BPL of, say, 78%, are reluctant to modify their operations to use phosphate rock of lower BPL. Nevertheless, high grade reserves capable of producing phosphate concentrates having a BPL in excess of 75% are fast being depleted. There exist reserves of ore capable, after careful beneficiation, of producing concentrates having a BPL in the range of 65 to 75%. It is evident that such reserves are of immense value in that they represent vast quantities of phosphorus which can be produced. Nevertheless, the concentrates obtained from such deposits do not meet with acceptance in the market place, and therefore such deposits cannot be exploited effectively.

It is an object of this invention to provide a method for upgrading phosphate concentrates to produce saleable phosphate rock of increased phosphorus content.

Another object of this invention is to provide a method for producing phosphate rock of increased phosphorus content having characteristics which make the rock convenient to use in the manufacture of fertilizer materials.

Other objectives of the invention will become apparent from the following description.

Briefly, the method of this invention comprises treating beneficiated phosphate rock with phosphoric acid in an amount sufficient to raise the BPL of the product to a commercially acceptable level, and then heating or calcining the treated rock to impart thereto desirable characteristics. The temperature of heat treatment is in the range of from 450° to 1400° F. The quantity and concentration of phosphoric acid employed is carefully controlled to provide a product having desirably high BPL, without adding such an amount of acid as will detract from the properties of the product rock when subsequently processed, as in the manufacture of superphosphate.

In accordance with this invention phosphate rock, such as Florida pebble phosphate, obtained by the beneficiation of sedimentary phosphatic ores, and having a BPL in the range of 65 to 80%, and more preferably in the range of 70 to 75%, are treated to increase the BPL to a value in the range of 75 to 85%, and more preferably in the range of 78 to 82%. Pebble phosphate employed in the process will be predominantly in the size range of 6 to 80 Tyler mesh, and more preferably predominantly 14 to 80 mesh size. The phosphoric acid employed in treating the pebble phosphate must have a $P_2O_5$ concentration of at least 25% by weight of the acid. The acid will be employed in an amount in the range of 5 to 20%, and usually 10 to 15% by weight of the phosphate rock. The use of lesser amounts of phosphoric acid, or phosphoric acids of lower concentrations, results in too small an increase in the phosphorus content of the pebble phosphate. On the other hand, the use of too much acid results in the production of an agglomerated mass of wet, sticky rock which cannot be handled in conventional equipment. Also, the concentration and quantity of acid added must be controlled to provide a product having a BPL in the range of 75 to 85%. The use of acid in an amount or concentration to produce BPL in excess of 85% is undesirable since the products have been found, on subsequent processing, to make unsatisfactory superphosphates.

It is decidedly preferred that the concentration of the phosphoric acid be of at least 50% $P_2O_5$, and that the amount of acid employed be in the range of 10 to 15% by weight of the pebble phosphate. Commercial wet process phosphoric acid, which generally has a $P_2O_5$ content of about 54%, is ideal. The phosphoric acid is applied to the rock to form a relatively uniform coating. This is accomplished, for example, by spraying the phosphoric acid on to a moving layer of pebble phosphate, for example, in a rotary drum type mixer. The mixture is discharged from the drum mixer after a suitable residence time of about 1 to 3 minutes, and is fed directly to a rotary kiln or other suitable drying or clacining apparatus.

The temperature of drying or calcination must be in the range of 450° F. to 1400° F. It has been found that calcination at lower temperatures results in a product having poor physical qualities. Specifically, rocks treated at temperatures below 450° F. have been found too sticky in storage, are excessively hydroscopic, and are abrasive and difficult to grind. When used as feed for wet process acid manufacture it was found that gypsum crystals produced under normal operating conditions were extremely minute with a resultant decrease in filtration rates, increasing washing requirements and poorer recovery of feed $P_2O_5$ values in the acid product. In contradistinction, treated rock processed at temperatures above 450° F. results in the production of a product of reduced hydroscopicity which has grinding characteristics approximately comparable to the original pebble phosphate concentrate, and reacts normally in wet process acid production.

Calcination at temperatures above 1400° F. is uneconomical, and provides no advantage. It has been found that the temperature of drying or calcination should be suited to the purpose for which the phosphate rock will ultimately be used. Specifically, where the rock is intended for use in the production of superphosphate fertilizer materials, drying at a temperature in the range of 450 to 700° F. is definitely preferred. Drying at higher temperatures results in the production of a rock which is too low in $CO_2$ content to make satisfactory superphosphate materials. Such superphosphate materials have been found to be non-porous and display poor handling and ammoniation characteristics. On the other hand, where the phosphate rock product is intended for use in the production of phosphoric acid, it is definitely preferred that the drying be carried out in the range of 800° F. to 1400° F. It has been found that such treatment greatly enhances the filtration characteristics of the gypsum crystals formed in the manufacture of phosphoric acid by the acidulation of phosphate rock with sulfuric acid. High temperature products (1200–1400° F.) in which the organic content of the phosphate rock has been degraded by oxidation, are extremely useful in processes utilizing nitric acid as the acidulation media. The lower $CaO/P_2O_5$ mol ratio results in a higher analysis product.

Example 1

To produce 80 BPL product phosphate rock, 550 pounds per hour of 72 BPL pebble phosphate screened to +14 −45 mesh was treated with 65.88 pounds per hour of 51.0% $P_2O_5$ wet process phosphoric acid. The mixture was fed into a rotary drum mixer and then into a rotary dryer. Gas inlet temperature to the dryer was 1300° F. The gas exhaust temperature was 620° F. and the temperature of the phosphate rock at discharge from the dryer was 500° F. The maximum rock temperature in the dryer was 550° F. The product phosphate rock assayed 80.85% BPL.

Example 2

To produce 75 BPL upgraded rock, the only change in conditions from Example 1 was to reduce the phosphoric acid feed rate to 24.16 pounds per hour. All other conditions were maintained the same as in Example 1.

Example 3

Four samples of upgraded phosphate rock were prepared substantially as set forth in Example 1, with the exception that the quantities of acid employed were varied to produce the product BPL indicated in Table I, and the drying temperatures were as set forth in the column headings of Table I.

TABLE I.—CHEMICAL ANALYSES OF UPGRADED ROCKS

|  | 80 BPL dried at 550° F. | 80 BPL dried at 220° F. | 84 BPL dried at 1,400° F. | 77 BPL dried at 220° F. |
| --- | --- | --- | --- | --- |
| Percent total $P_2O_5$ | 37.1 | 36.0 | 38.7 | 35.6 |
| Percent BPL | 81.1 | 78.7 | 84.6 | 77.8 |
| Percent CaO | 45.43 | 42.95 | 47.10 | 44.22 |
| Percent $Fe_2O_3$ | 1.41 | 1.44 | 1.36 | 1.37 |
| Percent $Al_2O_3$ | 1.16 | 0.94 | 1.20 | 1.10 |
| Percent F | 3.69 | 3.34 | 1.59 | 3.18 |
| Percent $CO_2$ |  | 2.48 | 2.75 | 4.68 |
| Percent $SiO_2$ | 3.92 | 2.83 | 4.73 | 4.14 |
| Percent acid insoluble | 4.29 | 4.16 | 4.87 | 4.43 |
| Percent $SO_3$ | 1.12 | 1.40 | 1.00 | 1.36 |
| Percent W.S. $P_2O_5$ | 1.0 | 7.65 | 0.25 | 5.85 |
| $CaO/P_2O_5$ M.R. | 3.11 | 3.03 | 3.09 | 3.16 |

Example 4

Seven samples of 72 BPL phosphate rock sized to −14 +45 mesh were upgraded to approximately 80 BPL by the technique described in Example 1. The temperatures of calcination were, however, adjusted to the values set forth in Table II. The calcined samples were tested for hydroscopicity by exposure to an atmosphere of 75% relative humidity at 90° F. The samples were then dried and the amount of water removed measured to determine the quantities of water absorbed by each sample. The results of the experiment are set forth in Table II.

TABLE II

| Samples | Calcined ° F. | Percent $P_2O_5$ | $H_2O$ Absorption (g.) | Percent $H_2O$ Absorption |
| --- | --- | --- | --- | --- |
| 1 | 300 | 34.9 | 0.035 | 1.2 |
| 2 | 400 | 35.4 | 0.052 | 1.8 |
| 3 | 500 | 35.4 | 0.023 | 0.8 |
| 4 | 600 | 35.4 | 0.012 | 0.4 |
| 5 | 700 | 35.8 | 0.011 | 0.4 |
| 6 | 1,200 | 36.5 | 0.006 | 0.2 |
| 7 | 1,400 | 37.2 | 0.003 | 0.1 |
| Feed, −14 +45 rock |  |  | 0.017 | 0.6 |

It will be seen from the data of Table II that a marked decrease in hydroscopicity is obtained when the temperature of calcination is increased from 400° F. to 500° F.

Degradation tests were run on a sample of rock upgraded substantially as set forth in Example 1. A one gallon can was fitted with a lift. A 200 gram sample was weighed into the can and rotated at 56 r.p.m. for various times. The sample was then screened and percent in each fraction compared to the feed and spiral concentrate screen analysis. Results are given in the following table:

TABLE III

| | Acid treated product, 550° F.—weight percent | | | |
| --- | --- | --- | --- | --- |
|  | Head | 5 min. | 15 min. | 30 min. |
| +35 | 77.0 | 70.2 | 69.2 | 68.9 |
| 35/65 | 18.9 | 25.3 | 26.1 | 26.5 |
| 65/100 | 3.6 | 3.9 | 4.2 | 4.0 |
| −100 | 0.5 | 0.6 | 0.5 | 0.6 |

The excellent degradation characteristics of the product are apparent.

Samples of pebble phosphate upgraded in accordance with this invention were acidulated with sulfuric acid employing the conventional technique for the manufacture of superphosphate. These experiments established the superiority of rock heated at a temperature within the range of 450 to 700° F. for superphosphate manufacture. Higher temperatures resulted in an excessively dense superphosphate, presumably due to the evolution of $CO_2$ in the drying at higher temperatures. Also, the quantity and concentration of phosphoric acid should be controlled so that the product phosphate rock has a $CaO/P_2O_5$ ratio of greater than 3:1 where the product is intended for use in the manufacture of superphosphate. Generally, for superphosphate manufacture, using 72 BPL pebble phosphate as a starting material, the quantity of acid employed should be sufficient to produce a final product BPL in the range of 78 to 82%.

Examination of rock upgraded in accordance with this invention by X-ray defraction technique disclosed the apatite, the chief constituent of the original phosphate rock, but no other identifiable compound. Quantities of other compounds, too small to detect, might, of course, be present. Also amorphous compounds would escape detection. Interestingly, no mono-calcium phosphate or dicalcium phosphate was detected.

While the invention has been described in detail with special emphasis upon the preferred embodiments thereof, and has been illustrated by specific examples, it will be understood that within the scope of the appended claims the invention can be practiced other than as specifically described.

The embodiments of the invention in which an exclusive property or privilege is claimed are defined as follows:

1. The method of increasing the phosphorus content of phosphate rock comprising treating beneficiated pebble phosphate having a BPL in the range of 65 to 80% and of a size predominantly in the range of −6 +80 mesh with 5% to 20% by weight of phosphoric acid having a $P_2O_5$ content in excess of 25%, the amount and concentration of said acid being such as to produce a product of 75 to 85 BPL, and heating the resulting material to a temperature in the range of 450° F. to 1400° F.

2. The process in accordance with claim 1 in which said pebble phosphate has an initial BPL of 70 to 75% and a size predominantly in the range of about −14 to +80 mesh.

3. The method in accordance with claim 2 in which the concentration of said phosphoric acid is about 50 to 55% $P_2O_5$.

4. The method in accordance with claim 3 in which the amount of phosphoric acid employed is in the range of 10 to 15% by weight of said pebble phosphate.

5. The method in accordance with claim 4 in which the product has a BPL in the range of 78 to 82%.

6. The method in accordance with claim 5 in which the temperature is in the range of 450 to 700° F.

7. The method in accordance with claim 5 in which the temperature is in the range of 800 to 1400° F.

References Cited

UNITED STATES PATENTS

| 1,994,070 | 3/1935 | Foss | 71—7 |
|---|---|---|---|
| 2,885,259 | 5/1959 | McCullough | 23—109 |
| 3,150,957 | 9/1964 | Seymour et al. | 71—41 |
| 3,208,821 | 9/1965 | Lehr et al. | 23—109 |

OSCAR R. VERTIZ, *Primary Examiner.*

L. A. MARSH, *Assistant Examiner.*